March 3, 1942. A. MAXTON 2,275,381
METHOD AND APPARATUS FOR USE IN MEASURING SPEED
Filed Aug. 7, 1939 3 Sheets-Sheet 1

Inventor
ALFRED MAXTON

March 3, 1942.  A. MAXTON  2,275,381
METHOD AND APPARATUS FOR USE IN MEASURING SPEED
Filed Aug. 7, 1939  3 Sheets-Sheet 2

Inventor
ALFRED MAXTON

March 3, 1942. A. MAXTON 2,275,381
METHOD AND APPARATUS FOR USE IN MEASURING SPEED
Filed Aug. 7, 1939 3 Sheets-Sheet 3
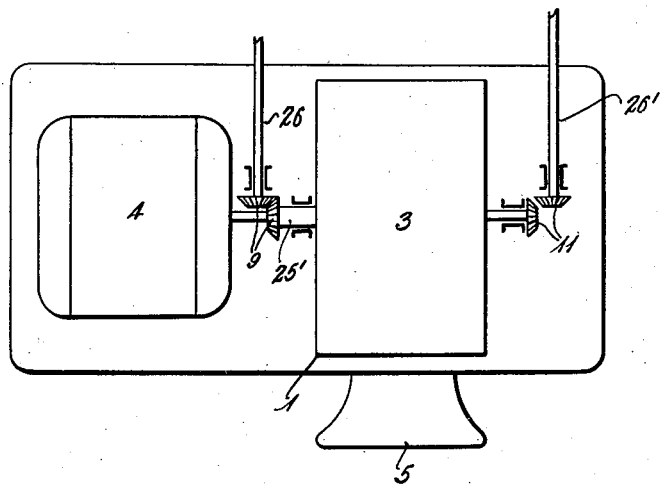
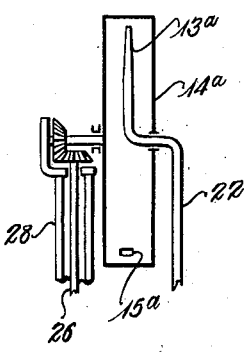
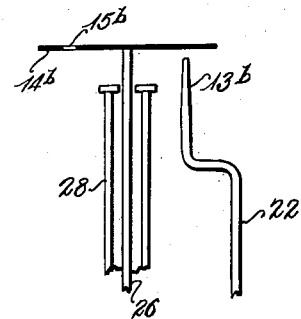
Inventor
ALFRED MAXTON Patented Mar. 3, 1942

2,275,381

UNITED STATES PATENT OFFICE.

2,275,381

METHOD AND APPARATUS FOR USE IN MEASURING SPEED

Alfred Maxton, Heinsberg, Rhine, Germany, assignor to North American Rayon Corporation, New York, N. Y., a corporation of Delaware Application August 7, 1939, Serial No. 288,816
In Germany August 18, 1938

10 Claims. (Cl. 88—14)

This invention relates to a method of optically determining the speed of a linear moving body such as a thread or yarn of freshly extruded cellulosic solution.

An object of the invention is to provide a means and apparatus for optically determining the linear speed of a thread as it passes along during its manufacture without applying any physical contact thereto.

Another object of the invention is to provide an optical instrument in the form of a stroboscopic viewing device for determining this linear speed in combination with a mechanism for applying visual spots or deposits of dye or color to the moving thread at regular periodic intervals.

In the manufacture of artificial threads, staple fibre and the like it is of great importance to maintain a uniform speed of the thread during its manufacture since the strength of the finished thread depends largely upon the extrusion speed of the cellulosic solution through the spinneret and the rotational speed of the take-up device. Thus it is particularly important to control the speed of the thread between the point of extrusion and the point of collection of the freshly formed thread. A fairly accurate control of the speed of thread is possible only at those places where the thread is drawn off by means of positively rotating devices, because in these instances the speed of the thread corresponds to the surface speed of the rotating device provided, of course, that a uniform contact of the thread with the device is maintained.

In all intermediate stages, however, whether in the precipitating bath or in the air distance between the surface of the precipitating bath and the collecting point or when passing through the thread guides, et cetera, little heretofore has been known about the speed of the thread and as a consequence adjustments and regulations could not be made in a desirable manner.

Such adjustment and regulation, however, are of decisive importance for the uniform qualities of the finished products, since it is necessary during the conversion of the cellulose solution into solid threads to compress these threads at certain points while in other places and at different moments they must be stretched. It is, therefore, a prerequisite that the speed of the thread at different places in the spinning be known with exactness in order for the operator to be able to make adjustments and to obtain the desired speed distribution.

Heretofore tachometer and similar instruments have been used which are driven by the running thread itself, but inasmuch as the thread at this stage of its manufacture is soft and pliable and likely to be materially transformed by any physical or mechanical contact, the linear speed thereof would, in turn, thus be modified. Thus mechanical devices for measuring the speed of the thread are of little practical value.

The present method for regulating and adjusting the speed of the thread by purely optical means renders possible the determination of the speed of the thread at any point in its travel without physically contacting the thread in any manner.

Broadly, the present method includes the application of marks or indicating signs of a readily removable color or dyestuff to the thread at regular periodic intervals and the measuring of these indications by means of stroboscopic devices, rotating mirrors or similar instruments as the marked thread passes before a measuring rod. When the desired data is obtained the speed of the thread may be adjusted to conform to the desired standard, which may be accomplished by means of rotating conveying devices with which the thread is wholly or partly in contact or by means of speed braking devices such as thread guides over which the thread slides, or the like.

The application of the dye spots or color points may be accomplished by a simple dripping device or by means of an automatic spray driven in combination with the stroboscope. It is preferable, however, to use this latter system and directly couple the dyeing apparatus with the operating shaft of the stroboscope or rotating optical mirror in order to eliminate relative differences in rotation and to obtain clearer stroboscopic pictures. The dyes or colors used in marking the threads are preferably those which may be readily subsequently removed, as for instance, when marking viscose threads, sulfuric acid dye solutions are applied to the yet acid threads and thus, do not materially change the physical and chemical characteristics of the thread.

In the drawings,

Fig. 3 is a front view of the measuring rod showing the calibration thereof and the indicators shiftably supported thereon;

Figure 4 is a top plan view illustrating a modified form of a portion of the apparatus shown in Figure 2;

Figure 5 is a plan view illustrating a modified type of dye applicator for use in lieu of the one shown in Figure 2; and Figure 6 is a plan view illustrating another modified type of dye applicator for use in lieu of the one shown in Figure 2.

Figure 1:
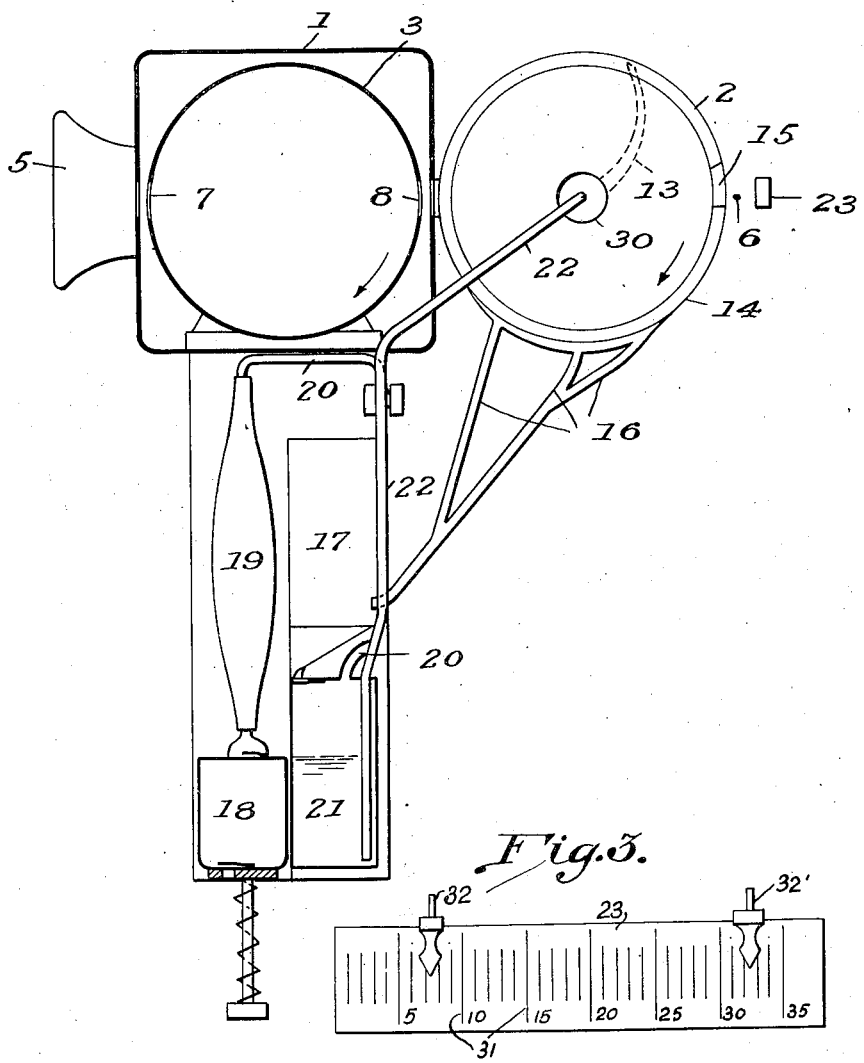
Fig. 1 is a diagrammatic illustration partly in section and partly in elevation of an apparatus capable of carrying out the present method.

As illustrative of an apparatus which may be used for carrying out the present method of determining the speed of a passing thread or yarn without physical contact therewith one may use the combination of a stroboscopic device 1 and a pair of color or dye applicators 2 and 2', whose mechanisms will now be described in detail.

The stroboscopic viewing apparatus 1 consists of a positively rotated drum 3 carried on horizontal shaft 25 driven by a motor 4. The drum 3 is provided with slits or openings 7 and 8 therein at diametrically opposite portions of its periphery, and an eye piece 5 is so positioned that the operator may observe the linear movement of the thread 6 as it passes in front of a measuring rod 23. This measuring rod is calibrated as shown at 31 and may be provided with indicators 32, 32' which are shiftable thereon.

Outwardly extending from the stroboscope 1 are a pair of tubular members 28 and 28' in which shafts 26 and 26' are enclosed, these shafts being positively driven by the motor shaft 25 through suitable drive pinions 9 and 11, respectively. The outer ends of the driven shafts 26 and 26' terminate in gear boxes 29 and 29', respectively, in which are positioned pinions 10 and 12, respectively, for driving shafts 27 at a right angle to the axis of the drive shafts 26 and 26', see Fig. 2. Secured to the inner faces of the gear boxes 29 and 29' are hollow disc-like members 14 within which a capillary tube or spray pipe 13 is adapted to revolve in clockwise direction, the tubes being secured for rotation on the inner end of shafts 27.

Suitably mounted below the stroboscopic casing 1 is a tank for dye or color 21 having discharge pipes 22 leading to stuffing boxes or glands 30 affixed at the center point of the hollow disc-like members 14 and connected thereto to the inner end of the capillary tubes 13. The dye or color in the reservoir 21 is elevated by means of air pressure applied through piston 18, bellows 19, and pipe 20. When the piston is operated, air pressure is applied to the surface of the liquid in the reservoir and the liquid forced outwardly through discharge pipes 22 to the capillary tubes 13, the capillary tubes or nozzles being positively rotated inside of the casings 14 and the latter are each provided with a slit or opening 15 at a point opposite the moving thread 6. The swirling action of the capillary tube in the casing throws the dye outwardly through the slit 15 of the casing and thus applies spots of color to the thread at regular periodic intervals. Inasmuch as the nozzles 13 are discharging dye throughout their entire path of travel in the casings 14 and only discharge small quantities thereof through the openings 15, the excess coloring material is collected in the bottom of the casings and led back through pipes 16 to a collecting tank 17.

In operation, the thread to be measured is passed in front of the measuring rod 23 and between the rod and the peripheries of the discs 14. Within the discs 14 are positioned the spray pipes 13 which, as before described, are driven by the same power mechanism which drives stroboscopic drum 3. The operator forces dye or color into the apparatus and, as it is deposited at periodic intervals on the passing thread, the regularly appearing spots may be viewed through eye piece 5 and measured against calibrated rod 23. From this observation the operator may readily determine whether the thread is at the desired linear speed or whether it is running too fast or too slow and from this information the speed of the thread is accordingly regulated.

In operation the operator determines the number of revolutions of the stroboscope and synchronously rotating dye nozzles and thereafter calculates the speed of the thread according to the following formula: $v = n.1$, in which $v$ represents the speed of the thread per time unit, $n$ the number of rotations of the shafts, 1 the apparent distance between two dye spots following each other as observed in the stroboscope and read from the measuring rod.

Since the spray pipe 13 is rotated at the same speed as the stroboscope through which the thread is viewed, the dye spots on the thread will appear as stationary points. In the illustrated form of the invention it is evident that the viewing will occur twice as frequently as the spotting since there is but one dye applicator 13 shown in Figure 1 which will apply dye once in 360° of movement, while viewing will occur once in 180° of movement. Thus, in measuring the distance between successively applied dye spots, the operator will measure between alternate apparent spots which will be spots successively applied. The measuring rod 23 which may be calibrated in millimeters as shown at 31 will then indicate the distance between two successive spots on the thread. This distance may also be established by the use of two indicators 32, 32' which are shiftably supported on the measuring rod. In this case the indicators 32, 32' are adjusted on the measuring rod until they occupy the same position as two successive dye spots on the thread as observed through the stroboscope. If, for example, the stroboscope together with the spray pipe rotate at 3,000 R. P. M. and if the distance between two successive dye spots on the thread, as observed through the stroboscope is, for example, 27 mm., the speed of the thread at this place will be 81 meters per minute, i. e., the distance between two successive dye spots multiplied by the rotational speed of the stroboscope and dye applicator, or 0.027 meter × 3,000 R. P. M. = 81 meters per minute.

Figure 2:
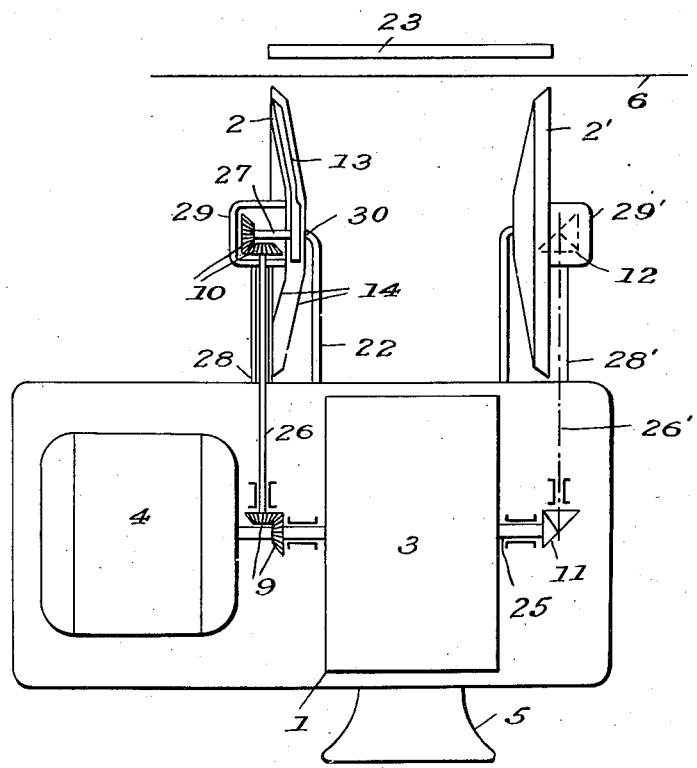
Fig. 2 is a top plan view partly broken away of the apparatus shown in Fig. 1.

The device illustrated in Fig. 2 of the drawings shows two disc-like members 14 each having a spray pipe 13. Either one or both of these spray pipes may be rotated. If the thread 6 travels from left to right, it is necessary that the left-hand spray pipe be in operation, while the right-hand spray pipe must be in operation when the thread travels from right to left, so that in each instance the dye spots deposited on the thread must travel through the area in front of the measuring rod 23.

If only one spray pipe is rotated the shaft of the stroboscope may be made displaceable so as to have engagement either with the driven shaft 26 or with the driven shaft 26'. A conventional manner of accomplishing this is shown in Figure 4 in which most of the elements of Figure 2 are retained and in which like reference numerals indicate like parts. However, in lieu of shaft 25, a hollow shaft 25' is employed for supporting the stroboscope 3, this shaft being displaceable so as to cause either gears 9 or gears 11 to mesh depending upon the direction of thread travel and hence which of the two dye applicators is to be used. The construction and manner of shifting shaft 25' form no part of this invention and any known means, such, for example, as that illustrated in United States Patent 225,695, may be employed. Upon reference to Figure 4, it will be seen that shaft 26 is shown in position to be driven. This will result in actuation of dye applicator 2 which is used when thread is moving from left to right as viewed in Figure 2.

In order to prevent the formation of large drops of dye on the outlet end of the spray pipe 13 it is important to decrease the wall thickness of the outlet end of the pipe to a minimum while the diameter of the outlet opening itself should be as small as possible, for example 3 mm. The spray pipe is preferably bent backward with respect to its direction of rotation, see Fig. 1.

Instead of rotating the spray pipe 13, a modified form of construction may consist in a device in which a spray pipe 13a is positioned stationary within a drum 14a and having its outlet end directed against the thread, while the drum having one or more slots 15a is rotated around the spray pipe at the same rotational speed as the stroboscope. The spray pipe sprays the dye constantly against the inner surface of the drum and only the slot or slots in the drum allow the dye to pass beyond the confines of the drum and onto the passing thread. In this regard, see Figure 5.

Also, a rotating disc 14b may be used instead of the drum 14a in combination with a stationary dye depositing tube. Referring to Figure 6, it can be seen that the disc which is driven synchronously with the stroboscope is positioned between the tube and the thread and is provided with one or more slots 15b. Upon rotation of the disc only the slots allow the dye, which is constantly sprayed against the disc by means of the tube, to pass through the disc and be deposited on the thread.

The details of construction of the stroboscope device are well known to those skilled in the art, and while a slotted drum type stroboscope has been shown and described to illustrate an apparatus capable of carrying out the present invention, it will be understood that optical instruments of the rotating mirror or similar type optical instruments may be used.

Having now described my invention as required by the patent statutes, what I claim is:

1. The method of determining the linear speed of a body continuously moving at a speed in excess of that required for persistence of vision which comprises, marking said body at known regularly recurring time intervals, viewing the markings only at regularly recurring time intervals, the ratio of the marking intervals to the viewing intervals being that between whole numbers, and measuring the distance between succeeding markings as they appear at said recurring viewings, which measurement will represent the distance of linear movement of the body during the known marking interval.

2. The method of determining the linear speed of a thread continuously moving at a speed in excess of that required for persistence of vision which comprises, applying a fugitive dye to said thread at known regularly recurring time intervals, viewing the dye markings only at regularly recurring time intervals, the ratio of the dyeing intervals to the viewing intervals being that between whole numbers, and measuring the distance between succeeding dye markings as they appear at said recurring viewings, which measurement will represent the distance of linear movement of the thread during the known dyeing interval.

3. The method of determining the linear speed of a thread continuously moving at a speed in excess of that required for persistence of vision which comprises, marking said thread at known regularly recurring time intervals, viewing the markings only at regularly recurring time intervals, the ratio of the viewing intervals to the marking intervals being one to two, and measuring the distance between succeeding markings as they appear at said recurring viewings, which measurement will represent the distance of linear movement of the thread during the marking intervals.

4. The method of determining the linear speed of a thread continuously moving at a speed in excess of that required for persistence of vision which comprises, marking said thread at known regularly recurring time intervals, viewing the markings only at regularly recurring time intervals, the marking and viewing intervals being of equal duration, and measuring the distance between succeeding markings as they appear at said recurring viewings, which measurement will represent the distance of linear movement of the thread during the known marking interval.

5. The method of determining the linear speed of a continuously moving freshly spun thread of viscose rayon, the speed of movement of which is in excess of that required for persistence of vision, which comprises, applying an acid type fugitive dye to said thread at known regularly recurring time intervals, viewing the markings only at regularly recurring time intervals, the ratio of the viewing intervals to the dyeing intervals being that between whole numbers, and measuring the distance between succeeding dye spots as they appear at said recurring viewings, which measurement will represent the distance of linear movement of the thread during the known interval between dye applications.

6. Apparatus for determining the linear speed of thread moving in a substantially fixed path comprising, means for the regular periodic application of visible markings to the thread, a stroboscope located in viewing position with respect to a length of the marked thread, means for actuating said stroboscope and said marking means in synchronism, the speed ratio between the marking means and the stroboscope being that between whole numbers, and means in the field of view of the stroboscope and adjacent the path of said thread for indicating the distance between succeeding markings on the moving thread.

7. Apparatus for determining the linear speed of thread moving in a substantially fixed path comprising, rotatable means for the regular periodic application of a liquid dye to the thread, a stroboscope located in viewing position with respect to a length of the marked thread, means for actuating said stroboscope and dye applicator at the same rotational speed, and means in the field of view of the stroboscope and adjacent the path of said thread for measuring the distance between succeeding dye spots thereon.

8. Apparatus for determining the linear speed of thread moving in a substantially fixed path comprising, means for continuously directing a stream of dye against the moving thread, movable means for intercepting said stream to cause intermittent marking of the thread thereby, a stroboscope located in viewing position with respect to a length of the marked thread, means for actuating said stroboscope and the dye stream intercepting means in synchronism, the speed ratio between the dye intercepting means and the stroboscope being that between whole numbers, and means in the field of view of the stroboscope and adjacent the path of the thread for measuring the distance between succeeding dye spots thereon.

9. Apparatus for determining the linear speed of thread moving in a substantially fixed path comprising, means for continuously directing a stream of dye against the moving thread, movable means for intercepting said stream to cause intermittent marking of the thread, a stroboscope located in viewing position with respect to a length of the marked thread, means for actuating said stroboscope and dye intercepting means at the same speed, and means in the field of view of the stroboscope and adjacent the thread path for measuring the distance between succeeding dye spots on the moving thread.

10. Apparatus for determining the linear speed of thread moving in a substantially fixed path comprising, a rotatable drum type stroboscope disposed in viewing position with respect to a portion of the thread path, a housing defining a marginal aperture adapted to register with the path of the moving thread at a side of the field of view of the stroboscope, a rotatable nozzle mounted within said housing and adapted to spray liquid dye marginally thereof, means for driving said nozzle and said stroboscope at the same rotational speed, means for forcing dye to said nozzle, and means in the field of view of the stroboscope and adjacent the thread path for indicating the distance between successive dye markings on the thread.

ALFRED MAXTON.